United States Patent [19]

Jao

[11] Patent Number: 5,631,426

[45] Date of Patent: May 20, 1997

[54] SENSORS FOR VIBRATION DETECTION

[75] Inventor: Shyh-Hua Jao, Stow, Ohio

[73] Assignee: The Goodyear Tire & Rubber Company, Akron, Ohio

[21] Appl. No.: 519,902

[22] Filed: Aug. 28, 1995

[51] Int. Cl.$^6$ ................................................ G01H 1/00
[52] U.S. Cl. ................................................ 73/644; 73/587
[58] Field of Search .................... 73/649, 654, 632, 73/493, 644, 587, 661; 310/334, 336; 384/88, 91, 114

[56] References Cited

U.S. PATENT DOCUMENTS

| | | |
|---|---|---|
| 2,451,194 | 10/1948 | Braun . |
| 2,516,311 | 7/1950 | Ganz . |
| 2,557,434 | 6/1951 | Hoverder . |
| 2,607,990 | 8/1952 | Payamps . |
| 3,071,886 | 1/1963 | Stiller . |
| 3,147,169 | 9/1964 | Albertson ................ 73/630 |
| 3,638,889 | 2/1972 | Samuelson . |
| 4,421,288 | 12/1983 | Blaszkowski . |
| 4,495,641 | 1/1985 | Vernino ................ 381/91 |
| 4,569,077 | 2/1986 | Marinelli ................ 381/113 |
| 4,648,572 | 3/1987 | Sokol . |
| 4,836,482 | 6/1989 | Sokol . |
| 4,863,130 | 9/1989 | Marks, Jr. . |
| 5,280,724 | 1/1994 | Higo et al. ................ 73/641 |

*Primary Examiner*—John E. Chapman
*Attorney, Agent, or Firm*—David E. Wheeler

[57] ABSTRACT

A sensor, and a sensor object combination, makes possible the collection of vibratory data from an object while reducing extraneous data and making easier the obtainment of the data. The sensor comprises an elastomeric housing which includes a concave cup portion, and pick-up devices for collecting vibration signals. The concave cup portion comprises a suction cup which makes possible vacuum attachment of the pickup device to the object being tested. The data signal may be amplified, analyzed, and ultimately the data may be analyzed by a computer.

13 Claims, 2 Drawing Sheets

SENSORS FOR VIBRATION DETECTION

BACKGROUND OF THE INVENTION

The invention relates to sensors for measuring vibrations in objects.

It is known in the art that the vibratory characteristics of an object can be used to diagnose the condition of the object. Perhaps one of the simplest illustrations of this is tapping on a steel tank to determine the fluid level.

A more sophisticated illustration of the use of vibratory characteristics to diagnose an object can be found in the aircraft art. Periodically, to check for cracks in the fuselage, engineers attach a large number of sensors to an airplane, pressurize the airplane above normal pressurization, and check for cracks by listening for high amplitude signals indicative of component fractures, or other characteristic sounds. Typically, the sensors are attached to the fuselage using tape or glue such as epoxy or rubber cement. When duct tape or masking tape is used, extraneous sounds caused by the tape pulling loose from the fuselage are sometimes recorded and make the results difficult to interpret. Although using glue, when done right, works very well for obtaining data, the setup and breakdown of the sensors is very difficult and time consuming. After the test, the sensors often have to be cut away from the object and the residue glue removed with a solvent.

Another use of vibratory analysis, specifically sound analysis, is the tire art where acoustic emissions can tell the engineer the integrity of a tire. Such acoustic emissions are particularly useful in monitoring earthmover and truck tires. When mounted on tires using epoxy glue, however, the epoxy forms a rigid bond between the sensor and the tire surface, and as the tire is deformed, the epoxy tends to partially debond and generate extraneous signals. Likewise, when duct tape is used, deformation of the tires causes the tape to break loose and also cause extraneous signals.

It is an object of this invention to provide an apparatus and a means by which vibratory data of objects are obtained more easily, and more reliable data is provided.

SUMMARY OF THE INVENTION

A sensor for measuring vibrations in an object comprises, a) a pickup means for collecting vibration data of an object by direct contact with said object and converting said data to an electrical signal, b) an elastomeric material attached to said pickup means which holds said pickup means and provides means for vacuum attachment to the object being measured. The elastomeric material covers and surrounds the pickup means except for a data collecting portion thereof. In the illustrated embodiment, the vibrations to be measured are acoustic emissions such as ultrasonic sound waves. At least a portion of the elastomeric material forms at least one suction cup.

Also included in the invention is an object/sensor combination which includes the sensor of the invention and a high transmitting media, such as wax, providing indirect contact between the pickup and the object. The object/sensor combination may include a vacuum enhancing material such as vacuum grease to increase the vacuum seal between the elastomer housing of the sensor and the object. In the illustrated embodiment, the pickup means is a piezoelectric sensor.

DETAILED DESCRIPTION OF THE INVENTION

Suction cups, for attaching mirrors and novelties to windows, and for the use on the end of toy arrows, are known in the art. The present invention uses the principal of the suction cup, i.e., the use of a concave rubber cup, which is evacuated of air by pressing the rubber onto an object, and wherein the vacuum created by placing the cup on an object holds the cup in position on the object. The same principle is used in the present invention in a housing used as the carrying means for a pickup (means for picking up sound emissions or other vibration data), and the housing together with the pickup form the sensor of the invention.

Figure 1:
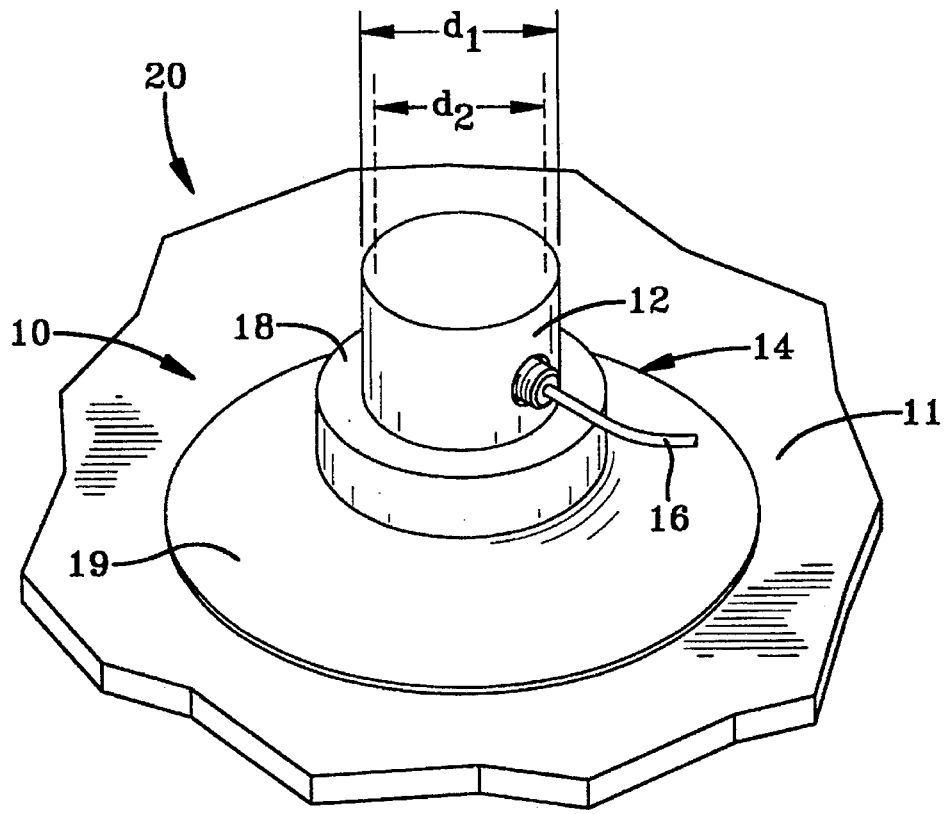
FIG. 1 illustrates a perspective view of a sensor of the invention attached to an object.
Figure 2:
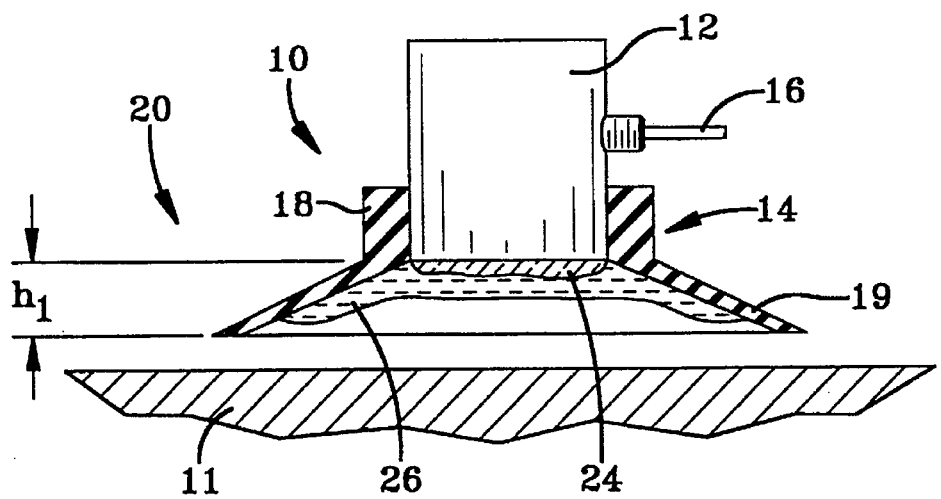
FIG. 2 illustrates a cross section of one embodiment of a sensor of the invention.

With reference now to FIGS. 1 and 2, sensor 10 comprises pickup 12 and elastomer housing 14. Elastomer housing 14 comprises a hub 18 and concave portion 19 (recognized as the suction cup portion of the apparatus).

Pickup 12 may comprise a transducer, a piezoelectric sensor, or any other type of sensor capable of picking up vibration data, or more particularly sound data, and converting it to electrical energy. In the illustrated embodiment, a piezoelectric sensor which picks up ultrasonic data is used. The pickup converts mechanical energy, such as sound waves, to an electrical signal which is transmitted through wire 16 as analog data to, for example, an amplifier then to a signal analyzer. The data may eventually be transmitted to a computer for analysis.

Those skilled in the art will recognize that sensor 10 can be made wireless by converting the analog signal to a radio signal and transmitting the data to a receiver.

Hub 18 is designed to have an inside diameter $d_2$ which is slightly less than the diameter $d_1$ of pickup 12. The small inside diameter $d_2$ of hub 18 makes sure that hub 18 makes a snug, vacuum tight fit on pickup 12.

Although pickup 12 is illustrated in the drawings as being round, those skilled in the art will recognize that the pickup may be made in any convenient shape, and the hub will be designed to match that shape, having smaller relative dimensions, in the same manner as for a round pickup.

Accordingly, sensor 10 is assembled by pressing pickup 12 into hub 18 to a predetermined point which makes possible contact of pickup 12 with an object 11 when concave portion 19 of housing 14 is pressed onto an object 11.

Although in the preferred embodiment, it is desired that pickup 12 contact the object being monitored, those skilled in the art will recognize that for some applications the pickup may be held somewhat distant from the object.

In those cases where direct or indirect contact of the pickup portion of the sensor with the object being monitored is desired, the height $h_1$ of pickup 12 in housing 14 is determined by the amount of compression that concave portion 19 undergoes to create a good vacuum seal on the object being monitored.

In some cases, it may be desirable to coat pickup 12 with a high transmitting media 24 such as wax, to make sure that contact of all parts of the sensor, through the high transmitting media, is consistent over the full surface of pickup 12. In addition, a medium 26 which helps maintain vacuum, such as vacuum grease or water, may be applied over the high transmitting media 24.

Figure 3:
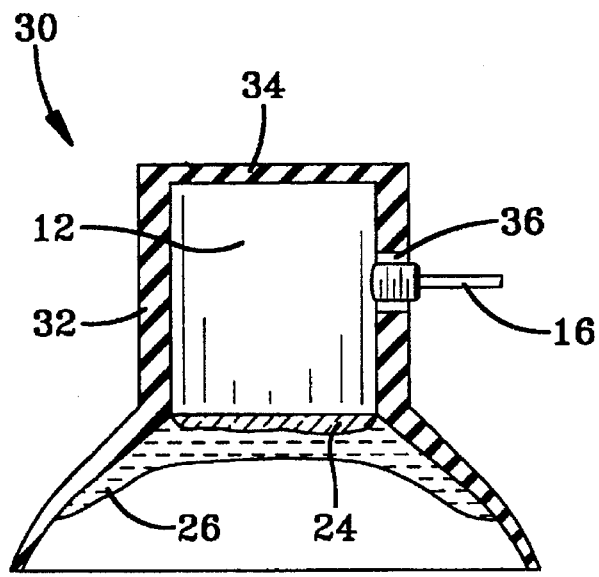
FIG. 3 illustrates a cross section of an alternative embodiment of the invention.

With reference now to FIG. 3, an alternative embodiment of the sensor of the invention is illustrated in which pickup 12 is encapsulated, i.e., totally surrounded by the elastomer of hub 32. Such an embodiment provides extra assurance that the sensor will not pass through hub 32 when being used and separate from the object which is being monitored. Hub 32 includes cap 34 which retains pickup 12 at the same height and opening 36 for passage of wire 16 therethrough. In its function, apparatus 30 operates in the same manner as that illustrated for the embodiment described in FIG. 2.

Figure 4:
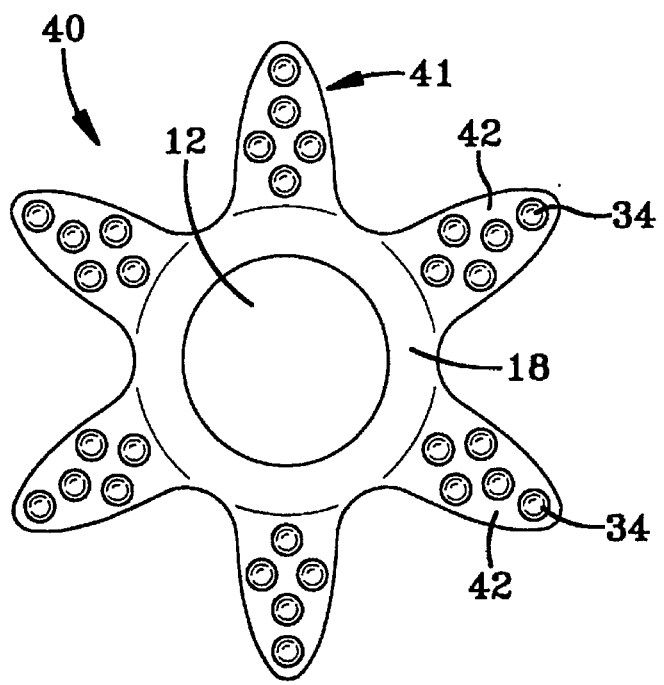
FIG. 4 illustrates another alternative embodiment of the sensor of the invention.

With reference now to FIG. 4, an alternative embodiment which may be used on objects that do not have smooth surfaces is illustrated. Sensor 40, as was the case in FIGS. 2 and 3, comprises a pickup 12 which is placed within a hub 18 of elastomeric housing 41. In the illustrated embodiment of FIG. 4, however, suction cups 34 are dispersed in legs 42 which may be placed independent of one another. As with the previous embodiments, however, housing 41 allows for direct contact, if desired, between pickup 12 and the object being monitored.

With reference again to FIG. 1, the sensor 10 of the invention is shown in combination 20 with an object 11 being monitored for vibration characteristics.

Since the sensors of the invention are easily attached and removed from an object, and extraneous data points are minimized, it is easy for a technician to provide a larger number of sensors than previously used on the object and still collate and digest the data obtained easier than with previous sensors.

The sensor of the invention will preferably comprise an unfilled elastomer, and more preferably an unfilled rubber. Fillers tend to reduce the elasticity of an elastomer, and for the purposes of the invention it is desirable that the elastomer of the housing, and especially the suction cup portion of the housing, is highly elastic and preferably a highly elastic rubber.

In the illustrated embodiment, the sensor housing comprises an unfilled transparent natural rubber. A rubber composition suitable for use in the invention comprises natural rubber and dicumyl peroxide (1.5 phr) and is cured in a mold at about 300° F. for about twenty minutes.

Also provided as part of the invention is the combination of an object and sensor wherein a sensor for measuring vibrations in an object comprising a) a pickup means for collecting vibration data of an object by direct contact with said object and converting said data to an electrical signal b) an elastomeric material having a concave cup portion attached to said pickup means which holds said pickup means, the concave portion providing means for vacuum attachment to the object being measured, and a first layer of high transmitting media and a second layer of vacuum enhancing material spread on the pickup means and surrounding elastomeric material, and the pickup means being adapted to be pressed into contact with an object, and the elastomer is distorted such that a rebound force is present in the elastomer which creates and works against a vacuum between the object and the sensor.

The position of the pickup means in the housing is adjusted to allow for pressing down of the suction cup portion of the housing to create a sufficient suction to hold the pickup on the object while making contact between the pickup means and the object. This is done by locating the pickup means at a height $h_1$ in housing 18 such that the amount of compression in cup 19 needed to create a vacuum equals the height $h_1$ of pickup means 12, such that pickup means 12 contacts object 11 when a vacuum is created.

The object may comprise a tire, an aircraft, an automobile, a kitchen appliance, machinery, or any other object on which vibratory analysis data may be useful.

Although simple suction devices have been illustrated and described, those skilled in the art will recognized that the invention can work with suction cups wherein mechanical devices are used to evacuate the air from between pickup 12 and the object 11. Such devices are well known to those skilled in the art.

While the invention has been specifically illustrated and described, those skilled in the art will recognize that the invention may be variously modified and practiced without departing from the concepts of the invention. The scope of the invention is limited only by the following claims.

What is claimed is:

1. A sensor for measuring vibrations in an object comprising (a) a pickup means for collecting vibration data of an object by contact with said object and converting said data to an electrical signal, and (b) an elastomeric material in the form of a housing wherein at least a portion of said housing forms at least one suction cup and provides means for vacuum attachment to the object being measured and wherein said housing has a hub portion for holding a pickup portion of the sensor, said hub having smaller dimensions than said pickup portion for holding said pickup means with a vacuum tight seal.

2. The sensor of claim 1 wherein said elastomer covers and surrounds said pickup means except for a data collecting portion thereof.

3. The sensor of claim 1 wherein said vibrations to be measured are acoustic emissions.

4. The sensor of claim 3 wherein said acoustic emissions are ultrasonic sound waves.

5. The sensor of claim 1 wherein said suction cup has a concave shape to increase suction strength.

6. The sensor of claim 1 wherein said housing comprises an unfilled rubber.

7. The sensor of claim 1 wherein said pickup means is piezoelectric.

8. The sensor of claim 1 wherein said housing comprises a hub and a plurality of legs, wherein suction cups are in the legs.

9. The sensor of claim 1 wherein said pickup means converts an ultrasonic signal to a wired or wireless electrical signal.

10. An object/sensor combination which includes a sensor for measuring vibrations in an object comprising a) a pickup means for collecting vibration data of an object by contact with said object and converting said data to an electrical signal b) an elastomeric material attached to said pickup means which holds said pickup means and provides means for vacuum attachment to the object being measured and a high transmitting media covering the pickup portion of the sensor and providing indirect contact between the pickup means and the object and a vacuum enhancing material covering said high transmitting media to increase the vacuum seal between the elastomer housing of the sensor and the object.

11. The object/sensor combination of claim 10 wherein said high transmitting media is a wax.

12. The object sensor combination of claim 10 wherein said vacuum enhancing material is vacuum grease.

13. The object sensor combination of claim 10 wherein said pickup means is a piezoelectric sensor.

* * * * *